(12) United States Patent  
Canham (10) Patent No.: US 7,929,586 B2  
(45) Date of Patent: Apr. 19, 2011

(54) ELECTROMAGNETICALLY PUMPED ALKALI METAL VAPOR CELL SYSTEM

(75) Inventor: John S. Canham, Ellicott City, MD (US)

(73) Assignee: Alliant Techsystems Inc., Minneapolis, MN (US)

( * ) Notice: Subject to any disclaimer, the term of this patent is extended or adjusted under 35 U.S.C. 154(b) by 145 days.

(21) Appl. No.: 12/404,593

(22) Filed: Mar. 16, 2009

(65) Prior Publication Data

US 2010/0232460 A1    Sep. 16, 2010

(51) Int. Cl.
*H01S 3/00* (2006.01)
*H01S 3/223* (2006.01)

(52) U.S. Cl. ............................................ 372/37; 372/56

(58) Field of Classification Search .................... 372/37, 372/55, 56
See application file for complete search history.

(56) References Cited

U.S. PATENT DOCUMENTS 5,335,238 A * 8/1994 Bahns .............................. 372/37
7,379,486 B2 * 5/2008 Lust et al. ....................... 372/70

OTHER PUBLICATIONS

Snavely, W. H. et al. "Alkali Metal Resistant Electrical Devices," Air Force Technical Report AFAPL-TR-68-61, Jun. 1968.

* cited by examiner

*Primary Examiner* — Armando Rodriquez
(74) *Attorney, Agent, or Firm* — IPLM Group, P.A.

(57) ABSTRACT

An electromagnetic pumped alkali metal vapor cell system is provided. The system comprises a vapor cell and windings. The vapor cell contains alkali metal and a buffer. The windings are positioned around the vapor cell and are configured to create an electromagnet field in the vapor cell when an AC signal is applied to the windings. The electromagnetic field pumps unexcited alkali vapor into unionized D1 and D2 states.

25 Claims, 5 Drawing Sheets

ELECTROMAGNETICALLY PUMPED ALKALI METAL VAPOR CELL SYSTEM

BACKGROUND

Diode pumped alkali metal laser systems (DPALS) show promise as efficient, high power density and compact lasers for direct energy applications. DPALS have extremely low quantum defect heating effects that provide an efficiency loss mechanism. Current DPALS systems have a potential for approximately 30% theoretical optical to optical efficiency. This efficiency is due to excited state population equilibration and sweeping of the one excited state due to the excitation beam. The wall plug efficiency (the percentage of optical power out compared to the total system input power) is also decreased by the roughly 50% due to electrical to optical power efficiency of laser diodes, and the loss in the power supply and the pump diode wavelength control system. Although this seems like poor efficiency, it is actually good efficiency for current lasers. Current wall plug efficiencies are on the order of 5-10%.

Although, DPALS show an improvement in efficiency, there are some technology issues with DPALS. Among the issues with these systems include the issue of pumping energy into the narrow line width D2 state and the transfer of energy into the D1 state from which the stimulated emission of energy occurs. Because of the narrowness of the ground state to D2 absorption line, significant technology and expense is necessary to efficiently pump energy into the system. Currently, the cost of the pump laser diodes in these cases will exceed the general cost on the order of $20-100 per watt, excluding the diode driver system. In addition, the problem is complicated by the requirement to collisionally equilibrate the D2 and D1 states with a buffer gas. There are reactivity issues with many of the collision/buffer gases. The result is that the cost and reliability of the DPALS systems are not at sufficient technology level to be offered for sale, in spite of their performance potential.

For the reasons stated above and for other reasons stated below which will become apparent to those skilled in the art upon reading and understanding the present specification, there is a need in the art for an effective and efficient alkali metal laser system.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, an electromagnetic pumped alkali metal vapor cell system is provided. The system comprises a vapor cell and windings. The vapor cell contains alkali metal vapor and a buffer. The windings are positioned around the vapor cell and are configured to create an electromagnet field in the vapor cell when an AC signal is applied to the windings. The electromagnetic field pumps unexcited alkali vapor into unionized D1 and D2 states.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention impose an oscillating magnetic field on alkali metal vapor in the presence of a buffering gas in a vapor cell. The oscillating electromagnetic filed accelerates the metal atoms causing metal ions to collide with the buffer exciting the system. Embodiments provide a direct method of exciting the alkali metal ions in a technologically simpler, more efficient, more reliable and less expensive manner. Hence, in embodiments, direct electromagnetic pumping is used to excite the metal atoms instead of a typical optical pumping system.

Figure 1A:
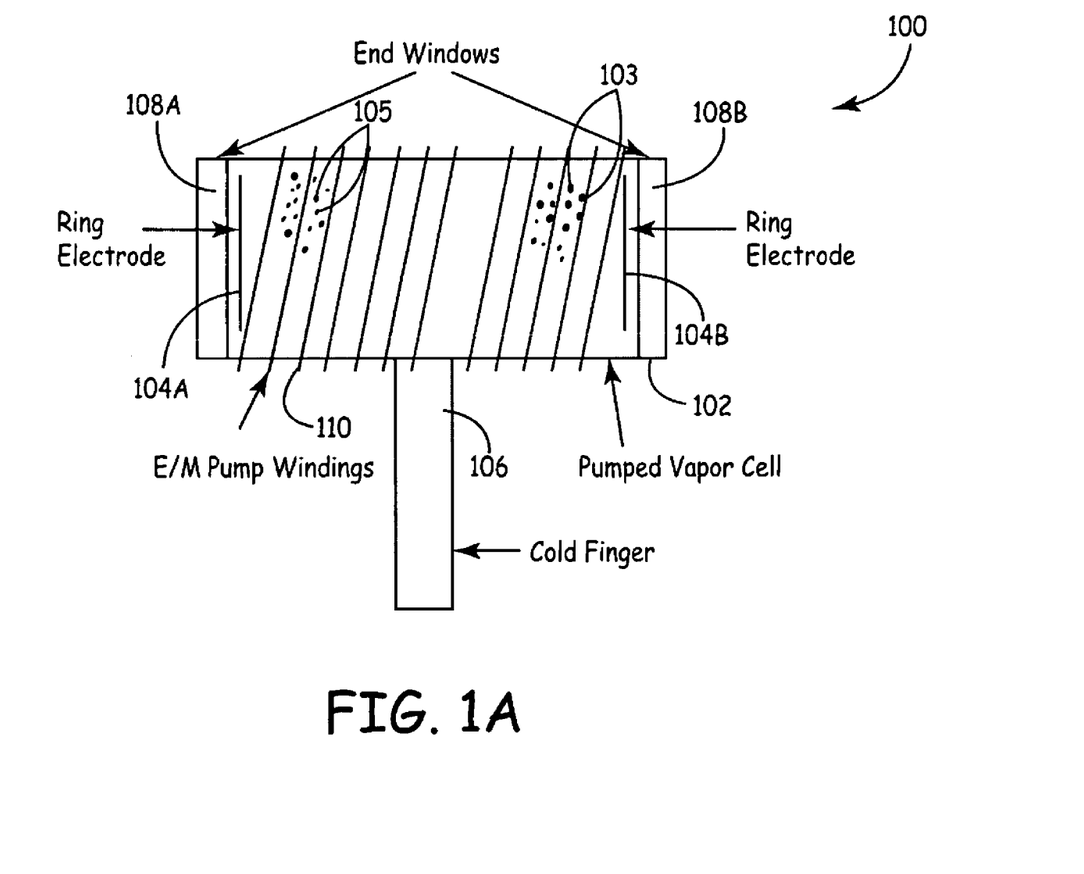
FIG. 1A is an illustration of an electromagnetic pumped alkali metal vapor cell device of one embodiment of the present invention.

One embodiment of an electromagnetic pumped alkali metal vapor cell device 100 is illustrated in FIG. 1A. The electromagnetic pumped alkali metal vapor cell device 100 includes a vapor cell 102 that encases alkali metal that is vaporized (vaporized alkali metal 103) and a buffer 105 (buffer gas 105). The buffer 105 is a non-reactive gas such as helium, argon, neon and xenon. The buffer is used to transfer energy from a relatively small population of excited alkali metal vapors 103 to level out the population. In the embodiment of FIG. 1, a cold finger 106 is coupled to the vapor cell 102. The cold finger 106 provides a heat sink to the vapor cell 102. In particular, the area of the vapor cell 102 coupled to the cold finger 106 will be cooler the rest of the vapor cell 102. This cooler area attracts condensation thereby keeping it away from end widows 108a and 108B of the vapor cell 102. In addition, the quantity of the gain media and metal vapor can be controlled by thermally controlling the cold finger 106 attached to the vapor cell 102. The end windows 108A and 108B retain the vaporized alkali metal 103 and buffer gas 105 in the vapor cell 102 and allow laser signals to pass through. A winding 110 (or electromagnetic pump winding 110) is wound around the outside of the vapor cell 110. Further in this embodiment, ring electrodes 104A and 104B are placed inside the vapor cell 102. An alternating current (AC) is applied through the winding 110 and the ring electrodes 104A and 104B to create oscillating electromagnetic fields.

The electromagnetic fields accelerate the metal atoms in the vaporized alkali metal 103 causing the metal ions to collide with the buffer 105 exciting the system. In particular, the interaction of the magnetic field pumps unexcited alkali metal vapor into unionized D1 and D2 states through the interaction of small thermal population of the paramagnetic excited states. The electromagnetic field drives the oscillation of a small population of magnetically active states. These oscillations collisionally activate additional alkali metal atoms or clusters. The subsequent activation species will then become magnetically active, resulting in further absorption of energy. As this mechanism will actively pump both D1 and D2 states (where the activation is largely collisional in nature) the populations should be near the equilibrium populations. Since there is no significant photon flux related to either the transitional from D1 or D2 to ground state, no stimulated emission, aside from amplified stimulated emission (fluorescence) should occur.

The use of embodiments has many benefits. The application of direct electromagnetic pumping of alkali metal vapor will result in a significant decrease in the cost per watt of pumping by several orders of magnitude. It also allows the pumping on a near equilibrium distribution of D1 and D2 states without sweeping either state by stimulated emission. In addition, embodiments can be carried out in either continuous or pulsed modes. Further, as stated above the quantity of the gain media and metal vapor can be controlled by thermally controlling the cold finger 106 attached to the vapor cell 102. Moreover, since embodiments do not rely on the ability to differentiate between D1 and D2 states in pumping and lasing, different types of alkali metals can be used that are inaccessible via current optical pumping technologies. The efficiency of the embodiments is significantly higher than a typical laser system since the embodiments should be capable of operating in a pseudo two state laser operation mode, thereby virtually eliminating the quantum defect energy loss. In addition, instead of optically pumping ground state atoms to the D2 state and then having to wait while these states relax to the D1 state, both states are collisionally excited in embodiments. This eliminates the need for an organic spin state equilibration catalyst thereby increasing the reliability and lifetime expectancy of the system.

The amount of energy introduced into the vaporized alkali metal 103 by the electromagnetic fields is dependant at least in part on the frequency of the AC signal on the winding 110 and the ring electrodes 104A and 104B. However, as one skilled in the art will understand, once the frequency in the winding 110 is increased to a relatively high level it becomes resistive making it hard to get energy into the vaporized alkali metal 103. Hence, the use of the winding 110 at high frequencies is not efficient in getting energy into the vaporized metal vapor. However, high frequency AC signals on the ring electrodes 104A and 104B is efficient at providing energy to the alkali metal vapor 103 via the electromagnetic field it creates. The ring electrodes 104A and 104B act like capacitor plates or antenna plates that produce an electromagnetic field when subject to high radio (RF) frequencies of the AC signals. On the other hand, low frequency AC signals on the ring electrodes 104A and 104B provides a weak electromagnetic field that is inefficient in providing energy to the alkali metal vapor 103. Therefore, by using both windings 110 and ring electrodes 104A and 104B, the system can be tuned using both low and high frequencies to achieve a desired electromagnetic field that provides optimum energy to the alkali metal vapor 103. Depending on the application, in other embodiments, only the windings 110 are used to produce the electromagnetic field and in yet other embodiments only ring electrodes 104A and 104B are used to produce the electromagnetic fields.

Figure 1B:
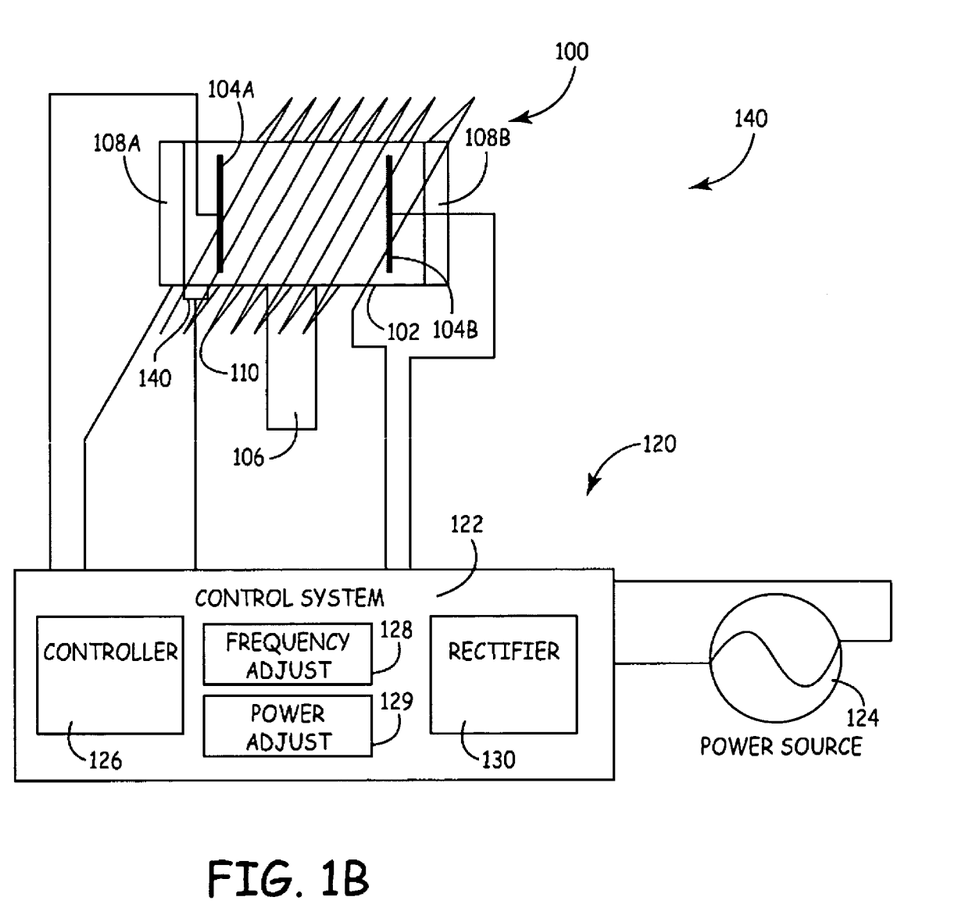
FIG. 1B is a block diagram of a electromagnetic pumped alkali metal cell system of one embodiment of the present invention.

Referring to FIG. 1B an illustration of an example of an electromagnetic pumped alkali metal cell system 140 of one embodiment is illustrated. The electromagnetic pumped alkali metal cell system 140 includes the electromagnetic pumped alkali metal vapor cell device 100 and an operating system 120. The operating system 120 includes a power source 124 and a control system 122. The control system 122 couples power from the power source to the respective windings 110 and the ring electrodes 108A and 108B. In this embodiment the control system 122 includes a frequency adjust circuit 128 that adjusts the frequency of an AC power signal from the power source 124 and a power adjust circuit 129 that adjusts the power of the AC signal to change the intensity of the electromagnetic field. The coupling efficiency is tunable based upon peak field intensity and frequency. Tuning of the excitation efficiency by adjusting the field and frequency distribution allows the stabilization of the operation of the active laser media. The frequency adjust circuit 128 is controlled by controller 126. The frequency adjusted AC signal is applied to the respective windings 110 and the ring electrodes 108A and 108B by the controller 126. In one embodiment, the frequency applied to the windings 110 is different than the frequency applied to the ring electrodes 108A and 108B. In one embodiment, a rectifier 130 is included in the control system 122. The rectifier 130 is used to convert the AC power source signal to a direct current (DC) signal. The DC signal is applied to the windings 110 in one embodiment to warm the vapor cell 102 before the AC signal is applied. In one embodiment, the vapor cell is warmed to between 100° to 150° C. to produce vapor from the alkali metal. Further in one embodiment, a temperature sensor 140 coupled to the vapor cell 102 provides a temperature signal to the controller 126. Based on the temperature signal, the controller 126 applies either the DC signal from the rectifier 130 or the AC signal having a select frequency and power to the windings 110. Operating system 120 is merely an example of a system that can provide AC and DC signals to the electromagnetic pumped alkali metal cell device 100. Other types of operating systems are contemplated and hence the present invention is not limited to a specific system.

The methods and techniques used by the control system 122 and in particular the controller 126 can be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Figure 1C:
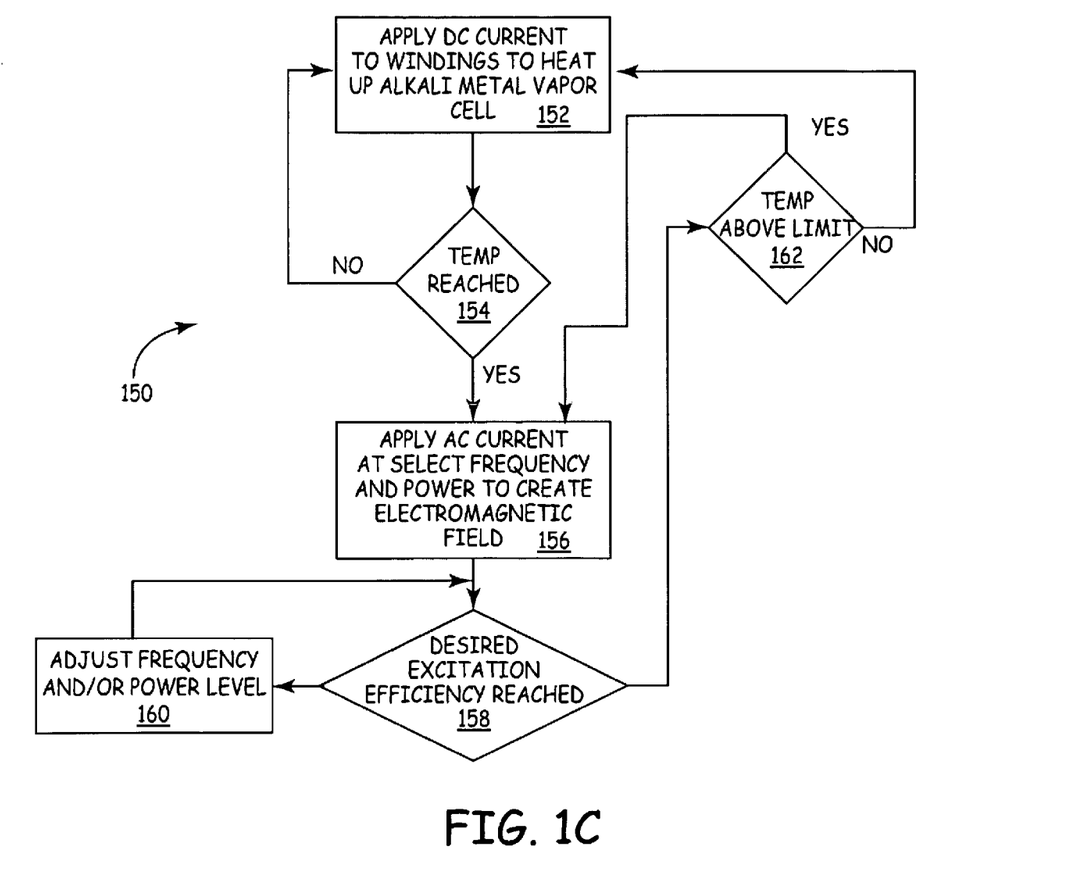
FIG. 1C is a flow diagram of the operation of a electromagnetic pumped alkali metal cell system of one embodiment of the present invention.
Figure 2:
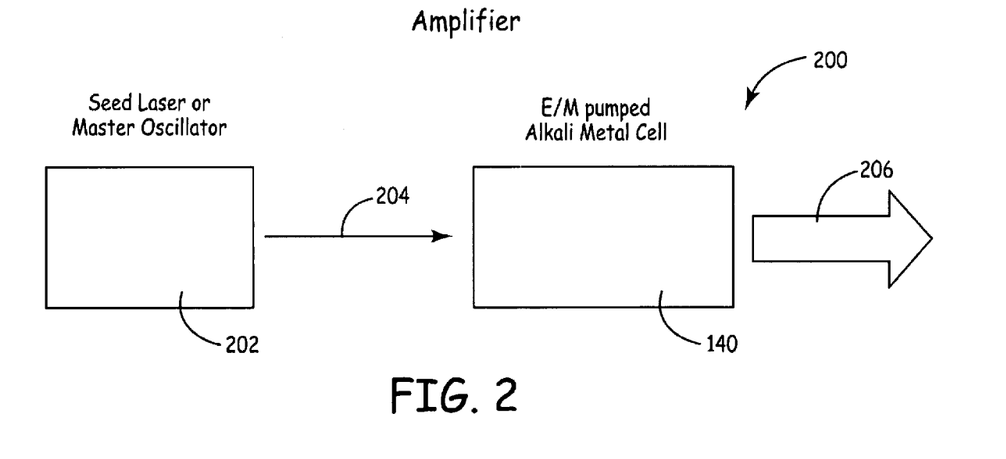
FIG. 2 is an illustration of an amplifier of one embodiment of the present invention.

FIG. 1C illustrates an operation flow diagram 150 of an electromagnetic pumped alkali metal vapor cell system 140 using methods and techniques of the controller 126 of one embodiment. This method starts by first applying a DC current to the windings 110 to heat up the vapor cell 102 (152). The temperature of the vapor cell 102 is then monitored to determine if it has reached a select predetermined temperature that would cause the alkali metal in the vapor cell 102 to turn to vapor (154). If the predetermined temperature is not reached (154), the process continues at (152) by continuing to apply the DC current to heat the vapor cell 102. Once the select predetermined temperature has been reached (154), an AC signal of a select frequency is used to create an electromagnetic field in the vapor cell 102 (156). In one embodiment, the AC signal is applied to windings 110 to produce the electromagnetic field. In another embodiment, the AC signal is applied ring electrodes 104A and 104B to produce the electromagnetic field. In yet another embodiment, the AC signal is applied to both the windings 110 and the ring electrodes 104A and 104B to produce the electromagnetic field. It is then determined if a desired excitation efficiency is reached (158). In one embodiment, this is done by comparing the difference between input power to the system 140 and the output power of the system. For example, in an amplifier system 200 as indicated in FIG. 2 below, the difference between the input power supplied by the seed laser 202 and an output of the electromagnetic pumped alkali metal cell system 140 is compared to determine efficiency. The power levels in one embodiment are measured with an optical signal measurement apparatus (not shown) such as but not limited to an optical power meter. If the desired excitation efficiency is not reached (158), the frequency and/or power level is adjusted (160). Once the desired excitation efficiency is reached (158), in one embodiment, the temperature is continued to be monitored to determine if it has fallen below a select limit while the electromagnetic field is being applied (162). If the temperature has fallen below a set limit (162), the process continues at (152) where a DC signal is applied to the windings 110 to once again heat up the vapor cell 102. If the temperature has not dropped below the limit (162), the electromagnetic field is maintained at (156). The excited vapor cell system 100 as described above has many applications. A few possible applications are discussed below.

FIG. 2 illustrates the application of an electromagnetic pumped alkali metal vapor cell system 140 in an amplifier system 200 of an embodiment. The amplifier system 200 includes a seed laser or master oscillator 202 and an electromagnetic pumped alkali metal vapor cell system 140. The seed laser 202 directs a laser signal 204 through an end widow 104A (illustrated in FIG. 1A) of the electromagnetic pumped alkali metal vapor cell system 100. When the laser signal passes through the inverted medium caused by the excited state, photons stimulate the excited atoms to emit additional photons of the same frequency, phase and direction resulting in amplification of the input intensity in a laser signal 206 output through the second end window 104B (also illustrated in FIG. 1B). Hence, the electromagnetic pumped alkali vapor in the vapor cell 102 provides an amplification of laser signals.

Figure 3:
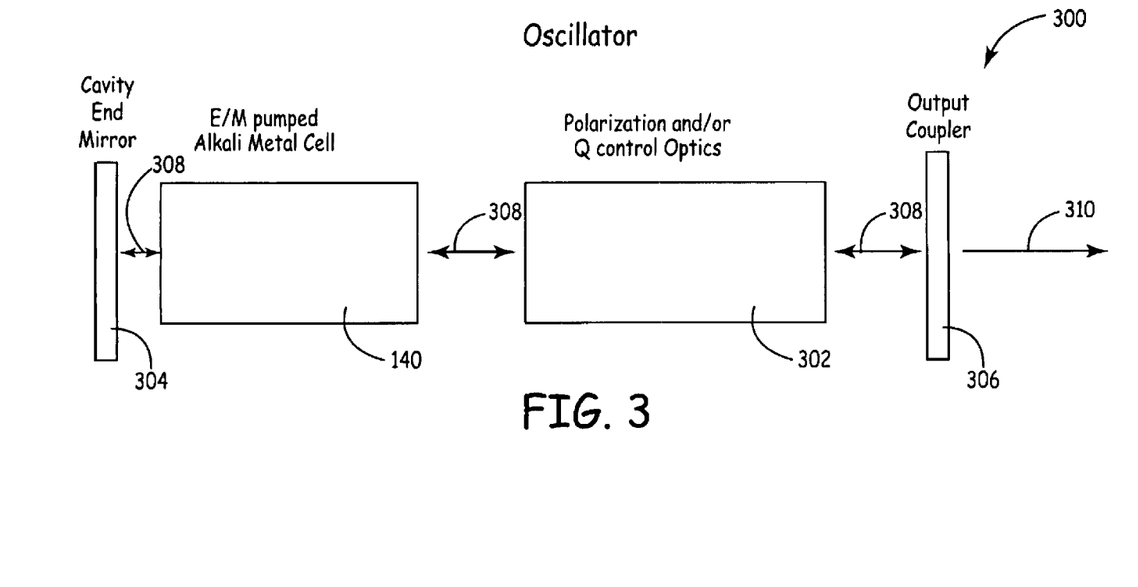
FIG. 3 is an illustration of an oscillator of one embodiment of the present invention.

Another embodiment is illustrated in FIG. 3. In FIG. 3 an oscillator system 300 is illustrated. In this embodiment, the electromagnetic pumped alkali metal vapor cell system 140 is positioned between an end cavity mirror 304 and polarization control optics 302 in one embodiment. The polarized control optics 302 is positioned between the electromagnetic pumped alkali metal vapor cell system 100 and an output coupler 306. As illustrated, a laser signal 308 is oscillated between the end cavity mirror, the vapor cell system 140, the polarization control optics 302 and the output coupler 300. The output coupler outputs a desired polarized laser signal 310. In use, the polarization control optics 302 in an initial state prevents most of the light (laser signal) from reflecting between the cavity end mirror 304 and the output coupler 306. This allows the build up of high population densities in the excited state, without allowing spontaneous and stimulated emission of the gain medium to reticulate through the laser cavity (the vapor cell system 140). Once, the build up of high population densities in the excited state is achieved, the polarization optics 302 changes to allow nearly all of the light (laser signal) to recirculate and be emitted in a short period of time. This results in high energy-short duration signal pulses 310 being output from the output coupler 306. The above describes one type of a oscillating quality-switched laser system (Q-switched laser system) that provides a laser system that outputs laser signals that are high energy-short pulses with the use of polarization rotation provided by the polarization controller optics 302. Other types of Q-switched laser systems using Q control optics 302 that modulate the effective recirculation efficiency (Q of the oscillator other than by polarization rotation) can be used. These types (embodiments) of oscillating Q-switched laser systems also provide shorter pulse lengths and higher pulse energies. Hence, the present invention is not limited to a single type of oscillator 300.

Figure 4:
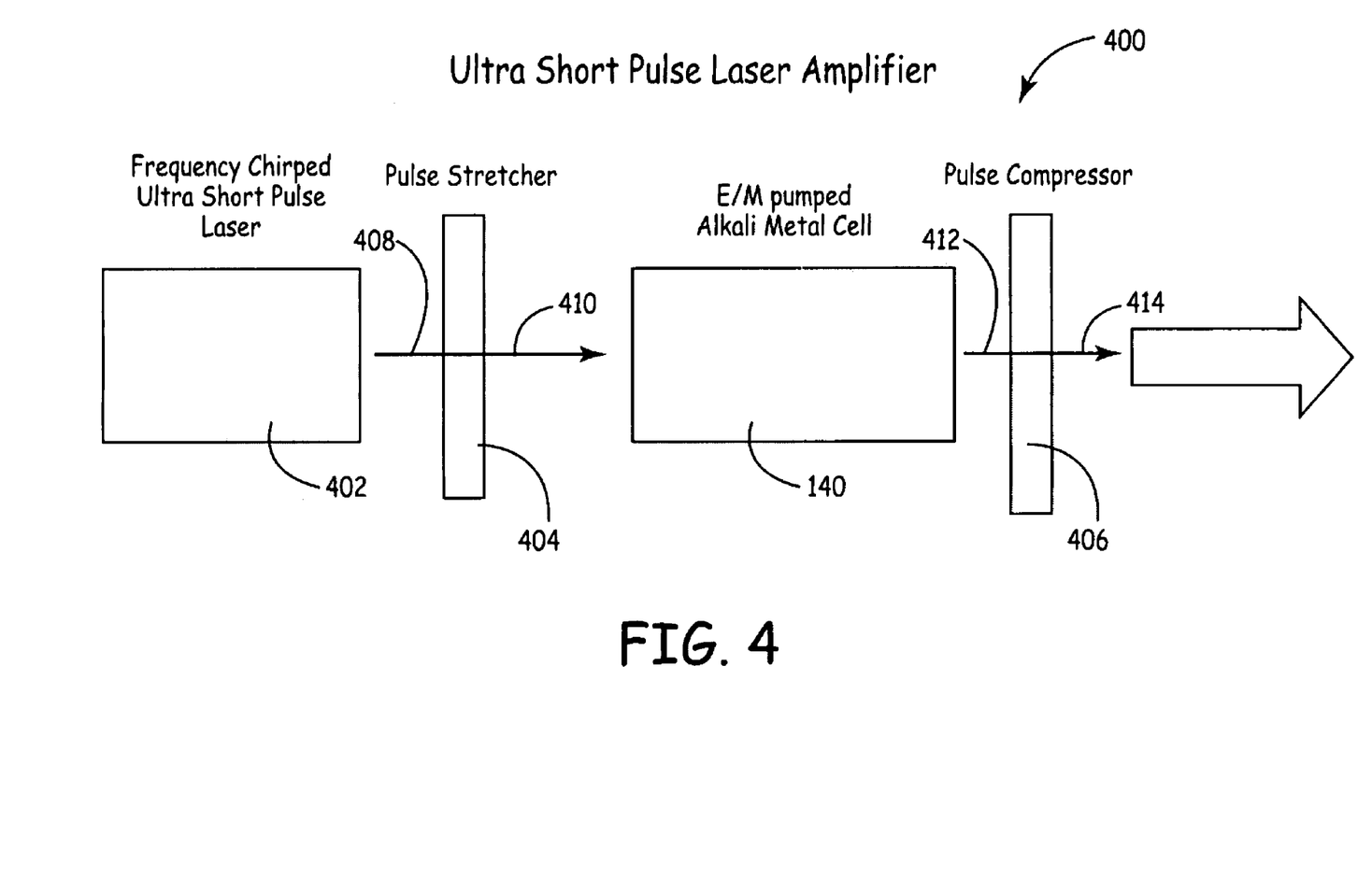
FIG. 4 is an illustration of an ultra short pulse laser amplifier.

FIG. 4 illustrates an embodiment of a short pulsed laser amplifier 400 that includes an electromagnetic pumped alkali metal vapor cell system 140 as discussed above. The short pulsed laser amplifier 400 includes a frequency chirped ultra short pulse laser 402 that produces a laser signal 408 that is passed through pulse stretcher 404. The stretched laser signal 410 then enters the electromagnetic pumped alkali metal vapor cell system 140 wherein it is amplified. The amplified laser signal 412 is then passed through a pulse compressor 406. An amplified ultra short pulse laser signal 414 is then output from the pulse compressor 406. Other applications for embodiments of the electromagnetic pumped alkali metal vapor cell system 100 include but are not limited to Doppler broadening, pressure tuning, Zeeman splitting as well as with other more esoteric electromagnetic effects (electric field induce transmissivity). In addition, an embodiment of the electromagnetic pumped alkali metal vapor cell system 100 uses mixed metal systems that modify the gain and emission envelop(s) of the cell for amplification purposes.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An electromagnetic pumped alkali metal vapor cell system, the system comprising:
   a vapor cell containing alkali metal vapor and a buffer;
   windings positioned around the vapor cell, the windings are configured to create an electromagnetic field in the vapor cell when an AC signal is applied to the windings; and
   a cold finger coupled to the vapor cell.

2. The system of claim 1, wherein the vapor cell further comprises:
- a first end window proximate a first end of the vapor cell; and
- a second end window proximate a second end of the vapor cell.

3. The system of claim 1, wherein the cold finger is coupled proximate a mid portion of the vapor cell.

4. The system of claim 1, further comprising:
- a first ring electrode positioned in the vapor cell proximate a first end of the vapor cell; and
- a second ring electrode positioned in the vapor cell proximate a second end of the vapor cell, wherein the first and the second electrodes are configured to produce an electromagnetic field in the vapor cell when an AC signal is applied across the first and second electrodes.

5. An electromagnetic pumped alkali metal vapor cell system, the system comprising:
- a power source;
- a control system coupled to the power source, the control system configured to apply an AC signal of a select frequency and power on the windings to create the electromagnetic field in the vapor cell;
- a frequency adjust circuit configured to adjust the frequency of the AC signal;
- a power adjust circuit configured to adjust the power of the AC signal; and
- a controller configured to control the frequency adjust circuit and the power adjust circuit.

6. An electromagnetic pumped alkali metal vapor cell system, the system comprising:
- a power source;
- a control system coupled to the power source, the control system configured to apply an AC signal of a select frequency and power on the windings to create the electromagnetic field in the vapor cell; and
- a rectifier circuit configured to convert an AC signal from the power source to a DC signal, wherein the control system is configured to apply the DC signal to the windings prior to the AC signal to warm the alkali metal to vapor.

7. The system of claim 6, further comprising:
- a temperature sensor configured to sense the temperature in the vapor cell, and
- a controller coupled to receive signals from the temperature sensor and apply the DC signal to the windings based on the received signals from the temperature sensor.

8. The system of claim 2, further comprising:
- a seed laser configured to output a laser signal through the first end window of the vapor cell.

9. An electromagnetic pumped alkali metal vapor cell system, the system comprising:
- a vapor cell containing alkali metal vapor and a buffer;
- windings positioned around the vapor cell, the windings are configured to create an electromagnetic field in the vapor cell when an AC signal is applied to the windings;
- a first end window proximate a first end of the vapor cell;
- a second end window proximate a second end of the vapor cell;
- a cavity end mirror to reflect laser signals back to the first end window of the vapor cell;
- polarization optics configured to polarize laser signals; and
- an output coupler configured to reflect select laser signals and pass output laser signals of a select polarization, the polarization optics positioned between the second end window of the vapor cell and the output coupler.

10. An electromagnetic pumped alkali metal vapor cell system, the system comprising:
- a vapor cell containing alkali metal vapor and a buffer;
- windings positioned around the vapor cell, the windings are configured to create an electromagnetic field in the vapor cell when an AC signal is applied to the windings;
- a first end window proximate a first end of the vapor cell;
- a second end window proximate a second end of the vapor cell;
- a cavity end mirror to reflect laser signals back to the first end window of the vapor cell;
- quality (Q) optics configured to condition laser signals; and
- an output coupler configured to reflect select laser signals and pass output laser signals of a select condition, the Q optics positioned between the second end window of the vapor cell and the output coupler.

11. An electromagnetic pumped alkali metal vapor cell system, the system comprising:
- a vapor cell containing alkali metal vapor and a buffer;
- windings positioned around the vapor cell, the windings are configured to create an electromagnetic field in the vapor cell when an AC signal is applied to the windings;
- a first end window proximate a first end of the vapor cell;
- a second end window proximate a second end of the vapor cell;
- a frequency chirped ultra short pulse laser;
- a pulse stretcher positioned to receive laser signals from the frequency chirped ultra short pulse laser;
- the first end window of the vapor cell positioned to receive laser signals from the pulse stretcher; and
- a pulse compressor positioned to receive laser signals from the second end window of the vapor cell, the pulse compressor configured to output laser signals.

12. An electromagnetic pumped alkali metal vapor cell system, the system comprising:
- a vapor cell having a first end window proximate a first end and a second end window proximate a second end;
- alkali metal received in the vapor cell;
- a buffer received in the vapor cell;
- a first ring electrode received in the vapor cell proximate the first end of the vapor cell;
- a second ring electrode received in the vapor cell proximate the second end of the vapor cell, the first and second ring electrodes configured to produce an electromagnetic field in the vapor cell;
- windings wrapping around the vapor cell configured to also produce an electromagnetic field in the vapor cell; and
- a cold finger coupled to the vapor cell.

13. The system of claim 12, further comprising:
- a power source; and
- a control system coupled to the power source, the control system configured to apply AC signals to the first and second electrodes and the windings to produce the electromagnetic fields in the vapor cell.

14. The system of claim 13, wherein the controller is further configured to apply a DC signal to the windings to warm up the vapor cell to produce alkali metal vapor from the alkali metal before the AC signals are applied.

15. The system of claim 12, further comprising:
- a seed laser configured to output a laser signal through the first end window of the vapor cell.

16. The system of claim 12, further comprising:
- a cavity end mirror to reflect laser signals back to the first end window of the vapor cell;
- polarization optics configured to polarize laser signals; and
- an output coupler configured to reflect select laser signals and pass output laser signals of a select polarization, the polarization optics positioned between the second end window of the vapor cell and the output coupler.

17. The system of claim 12, further comprising:
a cavity end mirror to reflect laser signals back to the first end window of the vapor cell;
quality (Q) optics configured to condition laser signals; and
an output coupler configured to reflect select laser signals and pass output laser signals of a select condition, the Q optics positioned between the second end window of the vapor cell and the output coupler.

18. The system of claim 12, further comprising:
a frequency chirped ultra short pulse laser;
a pulse stretcher positioned to receive laser signals from the frequency chirped ultra short pulse laser;
the first end window of the vapor cell positioned to receive laser signals from the pulse stretcher; and
a pulse compressor positioned to receive laser signals from the second end window of the vapor cell, the pulse compressor configured to output laser signals.

19. A method of operating a vapor cell, the method comprising:
heating alkali metal in a vapor cell to produce alkali metal vapor; and
applying an electromagnetic field in the vapor cell to pump unexcited alkali vapor into unionized D1 and D2 states.

20. The method of claim 19, wherein heating alkali metal in a vapor cell further comprises:
applying a DC signal in windings that surround the vapor cell.

21. The method of claim 19, wherein applying the electromagnetic field in the vapor cell further comprises:
applying an AC signal in windings that surround the vapor cell.

22. The method of claim 19, wherein applying the electromagnetic field in the vapor cell further comprises:
applying an AC signal across first and second ring electrodes that are located in the vapor cell.

23. The method of claim 19, further comprising:
adjusting at least one of the intensity and the frequency of the electromagnetic field to achieve a desired coupling efficiency.

24. The method of claim 19, wherein heating alkali metal in a vapor cell to produce alkali metal vapor further comprises:
heating the vapor cell to a determined temperature.

25. The method of claim 19, further comprising:
monitoring the temperature of the vapor cell.

* * * * *

UNITED STATES PATENT AND TRADEMARK OFFICE
CERTIFICATE OF CORRECTION

| | | |
|---|---|---|
| PATENT NO. | : 7,929,586 B2 | Page 1 of 1 |
| APPLICATION NO. | : 12/404593 | |
| DATED | : April 19, 2011 | |
| INVENTOR(S) | : Canham | |

It is certified that error appears in the above-identified patent and that said Letters Patent is hereby corrected as shown below:

Column 2, Line 36: "filed" should read --field--.

Column 2, Line 55: "...will be cooler the rest..." should read --...will be cooler than the rest...--.

Column 5, Line 55: "end widow" should read --end window--.

Column 6, Line 51: "Envelop(s)" should read --envelope(s)--.

Signed and Sealed this
Twelfth Day of July, 2011

David J. Kappos
*Director of the United States Patent and Trademark Office*